United States Patent
Janssen et al.

(10) Patent No.: US 6,803,902 B2
(45) Date of Patent: Oct. 12, 2004

(54) VARIABLE RATE ROW ADDRESSING METHOD

(75) Inventors: Peter J. Janssen, Scarborough, NY (US); John E. Dean, Stormville, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 359 days.

(21) Appl. No.: 10/114,495

(22) Filed: Apr. 2, 2002

(65) Prior Publication Data

US 2003/0184513 A1 Oct. 2, 2003

(51) Int. Cl.[7] .............................................. G09G 3/36
(52) U.S. Cl. ...................................................... 345/102
(58) Field of Search ................................. 345/102, 100, 345/99, 87, 88, 90, 98, 104; 348/744, 756, 757

(56) References Cited

U.S. PATENT DOCUMENTS

| | | | | |
|---|---|---|---|---|
| 3,622,692 A | * | 11/1971 | Stephens, Jr. ............... | 348/490 |
| 4,090,219 A | * | 5/1978 | Ernstoff et al. ............. | 348/742 |
| 5,410,370 A | * | 4/1995 | Janssen ....................... | 348/756 |
| 5,528,318 A | * | 6/1996 | Janssen ....................... | 348/756 |
| 5,548,347 A | * | 8/1996 | Melnik et al. .............. | 348/761 |
| 5,742,631 A | * | 4/1998 | Paoli ........................... | 372/50 |
| 6,529,336 B1 | * | 3/2003 | Kreitzer ...................... | 359/649 |
| 2001/0050661 A1 | | 12/2001 | Noda et al. .................. | 345/32 |
| 2002/0131022 A1 | * | 9/2002 | Shibatani et al. ........... | 359/15 |

* cited by examiner

*Primary Examiner*—Richard Hjerpe
*Assistant Examiner*—Ronald Laneau

(57) ABSTRACT

A uniform phase relation restoration method for a. scrolling color projection system wherein the addressing sequence of an LCD panel is altered to change the sweep rate of any one primary color relative to the other two primary colors to momentarily increase the sweep speed of the one color channel while correspondingly decreasing the sweep speed of the other two color channels.

5 Claims, 4 Drawing Sheets

VARIABLE RATE ROW ADDRESSING METHOD

TECHNICAL FIELD

The present invention relates generally to a method of improving the phase relationship between optical and electrical scans in a scrolling color projector and, more particularly, to a method of restoring a uniform phase relation between the optical and electrical scans.

BACKGROUND TECHNOLOGY

In scrolling color projection systems an arc lamp is frequently utilized as a source of an intense white light which is collected and separated using dichroic filters into the primary colors red, green and blue (RGB). This color separated light is caused to be formed into three sources, arrayed adjacently, such that each source appears to be narrow in a vertical direction and wider in a horizontal direction. Scanning optics are employed to cause these three bands of light, one of each of the primary colors, to be positioned onto the rear of a transmissive light valve panel. This panel may be a twisted nematic liquid crystal display (LCD) panel with a thin film transistor (TFT) addressing or other suitable types of light valves. The scanning optics causes the bands of primary color illumination to move sequentially across the LCD panel. As a band passes over the "top" of the active area of the LCD panel, a band of light of that color again appears at the "bottom" of the panel. Accordingly, there is a continuous sweep of the three primary colors (RGB) across the panel.

Prior to each color passing over a given row of pixels on the LCD panel, that row will have been addressed with the appropriate information for that color. This means that each row of the panel will be addressed three times for each video field which is to be displayed. This can be accomplished by either using extra addressing lines to the panel array, and writing the horizontal rows in parallel, or by writing three separated rows sequentially, but at three times the field rate. The information being written to the separated rows must be appropriate for the color content of that portion of the image which is being displayed.

Light from the LCD panel is projected by a color corrected projection lens or, alternatively, used in a direct view mode. The simultaneous use of a large portion of the available red, green and blue light to a single light valve panel eliminates the need to mechanically converge the image, and further reduces system costs. However, the speed of the color stripes produced by the prism scanner used in scrolling color projectors is not constant, but depends on the location of the color stripe on the LCD panel. Therefore, the electrical scan of the LCD panel, which occurs at constant speed, cannot be everywhere in phase with the illumination. This non-uniformity of phase relation between the optical and electrical scan causes color cross talk that varies over the panel.

Accordingly, the present invention is directed to overcoming one or more of the problems or disadvantages associated with the relevant technology.

SUMMARY OF THE INVENTION

In a preferred embodiment of the method of this invention, the addressing sequence of the LCD panel is altered to change the rate of any one color relative to the others. Such a change in sequence can momentarily increase the speed of one channel while correspondingly decreasing the speed of the other two channels. Depending upon the speed variations necessary, only occasional phase adjustments of the addressing sequence need be made.

BRIEF DESCRIPTION OF THE DRAWINGS

In the accompanying drawings, like reference numerals indicate corresponding parts throughout.

BEST MODE FOR CARRYING OUT THE INVENTION

Figure 1:
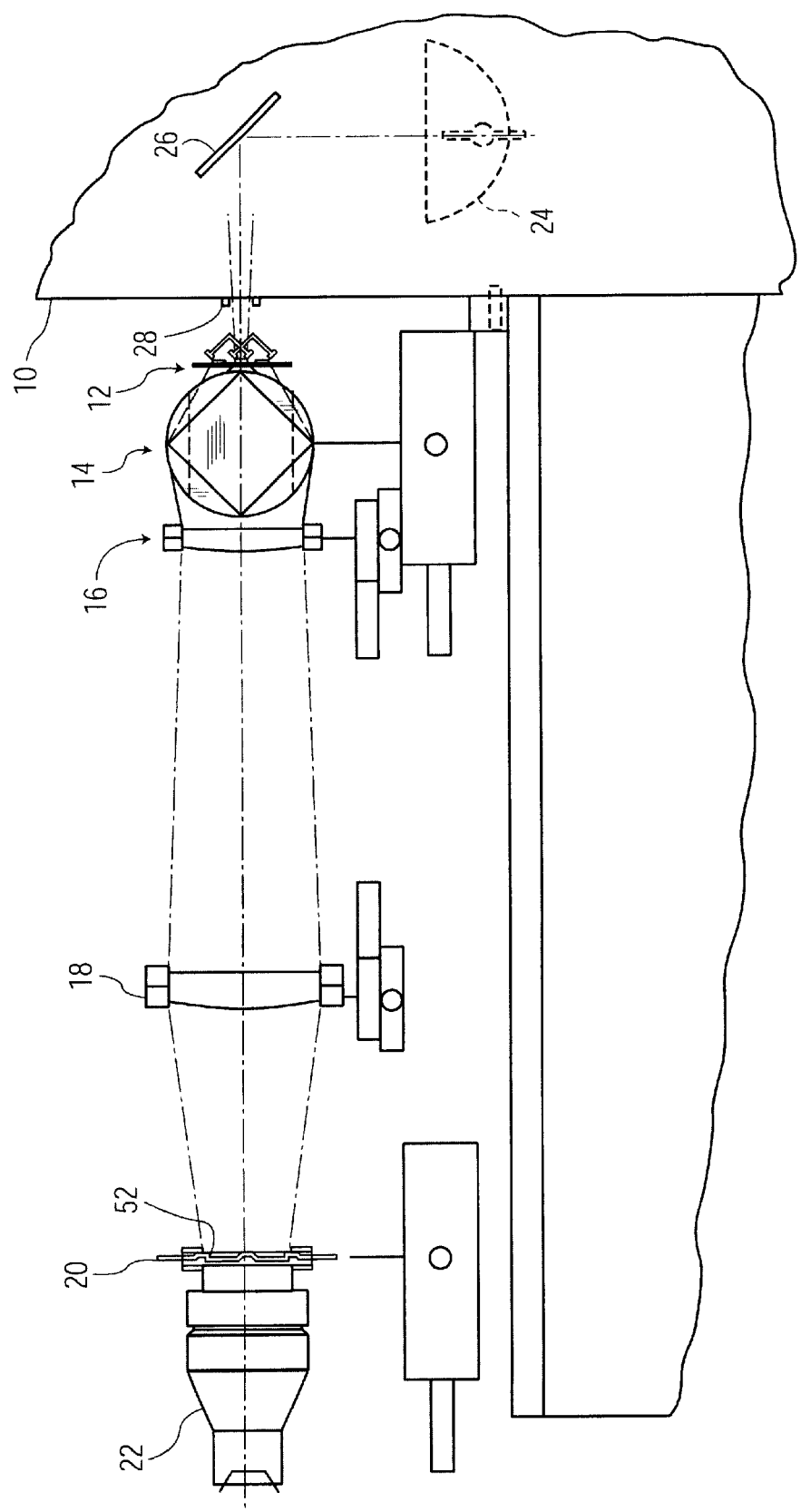
FIG. 1 is a side view of a typical scrolling color projector optical system utilizing a single panel color projection display.
Figure 2:
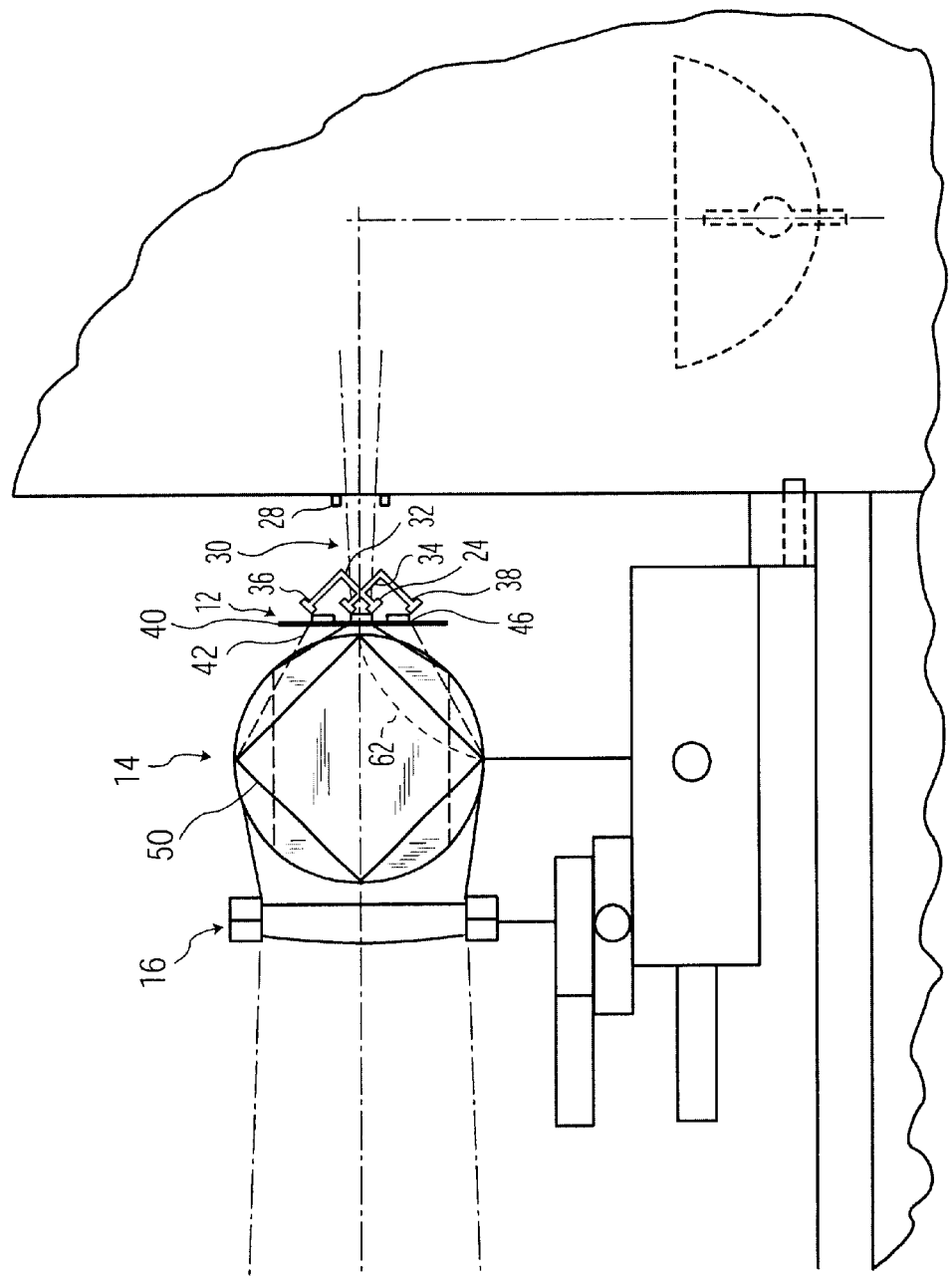
FIG. 2 is an enlarged side view of the color separation and scanning mechanism of the scrolling color projector illustrated in FIG. 1.

Referring now to the drawings, the following is a description of a preferred embodiment for practicing the invention with reference in part to one of the inventors prior patent, P. J. Janssen et al., U.S. Pat. No. 5,532,763 "Single Panel Color Projection Video Display.". As illustrated in FIG. 1 there is shown a scrolling color projection system 100 utilizing a light valve 20 having a single transmission LCD panel 52. The scrolling color projection system 100 includes a light box 10, a system of dichroic mirrors 12 for splitting the light into bands of red, green and blue (RGB), a rotating prism 14 for scanning the (RGB) bands, relay lenses 16 and 18, the light valve 20 upon which is impressed the video signals, and a projection lense 22. The light box 10 includes a projection lamp 24 of any suitable high intensity type, such a xenon arc lamp with an elipsoidal reflector. The output of the projection lamp is directed to a "cold" mirror 26 which reflects light in the visible spectrum while passing infrared light therethrough.

The beam of light from the lamp 24 emerges from an opening 28 in the light box 10 and is directed to the dichroic mirror system 12. The dichroic mirror system 12 splits the light beam 30 into separate (RGB) beams. The dichroic mirror system 12 includes centrally disposed crossed dichroic mirrors 32 and 34, which pass only the green light component of beam 30 and reflect the red light beam upwardly and the blue light beam downwardly to mirrors 36, 38, respectively. The upper mirror 36 may also be dichroic and is constructed and arranged to reflect the red light beam component of the light impinging thereon and the lower mirror 38 reflects only the blue light beam component of the light infringing thereon. Accordingly, the dichroic mirror system 12 serves to split light beam 30 into its (RGB) components which are arranged in the form of a vertical array. A vertical apertures plate 40 includes three vertically disposed rectangular apertures 42, 44 and 46 which also serve to rectangularize the three (RGB) light beams exiting the apertures with the red beam on top, the green beam in the middle and the blue beam on the bottom. After the (RGB) beams leave aperture plate 40, the beams impinge upon a rotating prism assembly 14 optical scanning mechanism. The prism assembly 14 includes a prism member 50 which has four equal flat sides and is rotated about a central longitudinal axis by a motor, not shown, which is driven in synchronicity with the electronic video signals coupled to light valve 20. The action of the rotating prism optical scanning mechanism is to cause the (RGB) bands of color to be scanned downwardly (or upwardly) in a sequential manner by refraction. The sequentially scanned (RBG) bands are directed towards light valve 20 by the relay lenses 16, 18. The relay lens 16 and 18 comprised an anamorphic imaging system (of a 4:1 ratio) which images the light from apertures 42, 44 and 46 onto light valve 20. As such, the rectangular active surface 52 of light valve 20 receives sequential scanning of the RGB rectangular color bands. The LCD panel 52, modulates the light impinging thereon in accordance with the desired video input information for the colors impinging on its various portions. Thereafter, the video modulated sequential bands of light are projected upon a suitable viewing surface, such as a projection screen, by means of the projection lens assembly 22.

In the electronics for the scrolling color projection system 100, separate red (R), green (G) and blue (B) signals are derived from the appropriate video input source as is well known to those skilled in the art. However, in order to drive the light valve 20 in accordance with the sequential color bands sequentially scanned thereacross by the rotating prism assembly 14, certain video signal processing is necessary. The parallel (RGB) signals must be serialized to serial stream wide, for example, the green signal delayed ⅓ of a video field behind the red signal and the blue signal delayed ⅓ of a video field behind the green signal. Thereafter, the serial stream is processed to conform to the column driver and geometrical arrangement of light valve 20.

Presently, the LCD panel 52 is addressed in a fixed sequence: RGB . . . R, G, B. Because the speed of the color stripes produced by the rotating prism scanning mechanism 14 is not constant, but depends on the location of the color stripe on the LCD panel 52, the electrical scan of the LCD panel 52 which occurs at constant speed, cannot be everywhere in phase with the illumination. The lack of a uniform phase relation between the optical and electrical scan causes color cross talk that varies over the LCD panel 52.

It has been determined that by restoring a uniform phase relation between the optical scan or the rotating prism scanning system 14 and the electrical scan of the separate R, G, B signals color cross talk caused by such lack of a uniform phase relation can be eliminated. Accordingly, by altering the (RGB) addressing sequence, the rate of any one color relative to the others can be changed. For example, the sequence in RRG . . . RRB momentarily doubles the speed of the red channel while cutting that of the green and blue in half. In general, such speed variations are not as large as require the doubling of one color and the halving of the other two, and only occasional phase adjustments need be made. Such speed variations and phase adjustments are affected by adjusting the serialization of the parallel (RGB) signals which are processed to conform to the column driver and geometrical arrangement of light valve 20.

Figure 3:
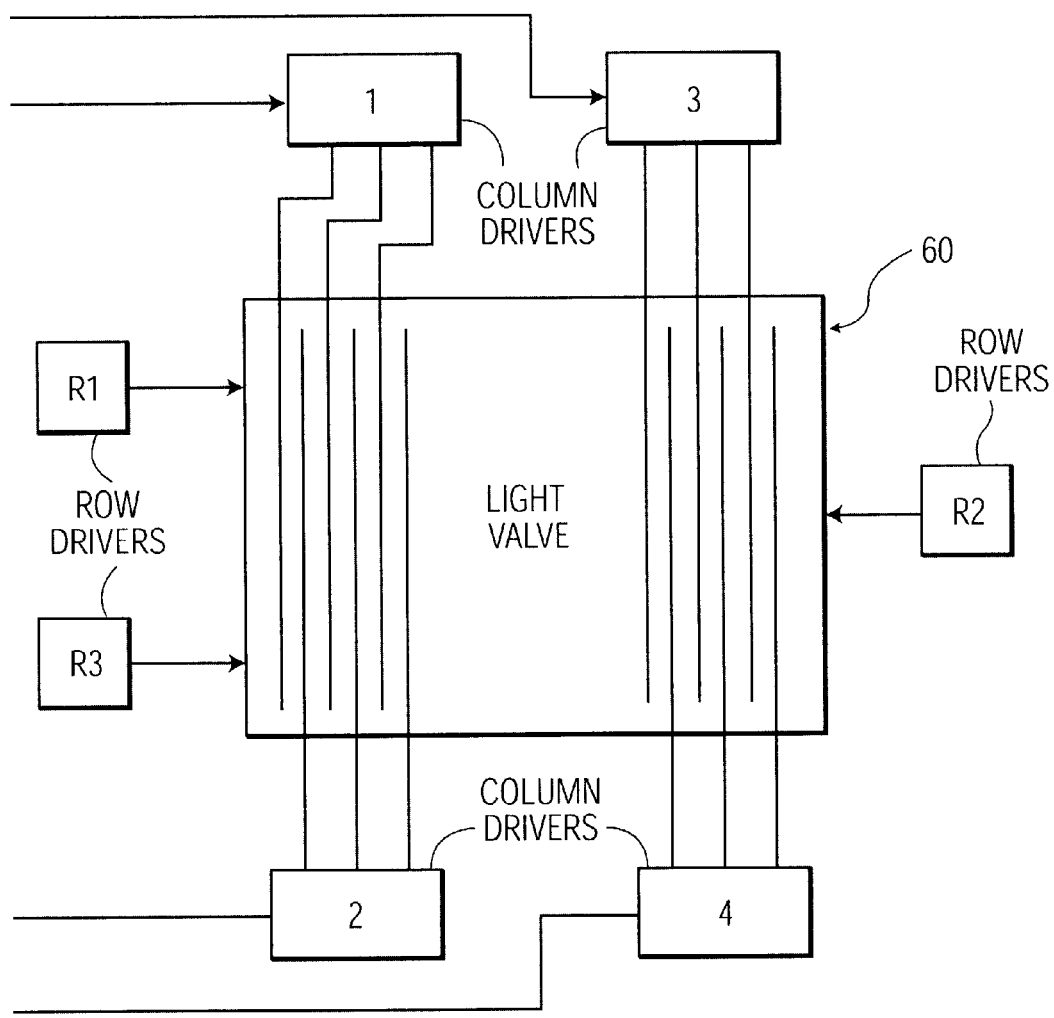
FIG. 3 is a diagramatic representation of the row and column drivers of the LCD array for sequentially scanning each of the three color bands over the LCD panel.
Figure 4:
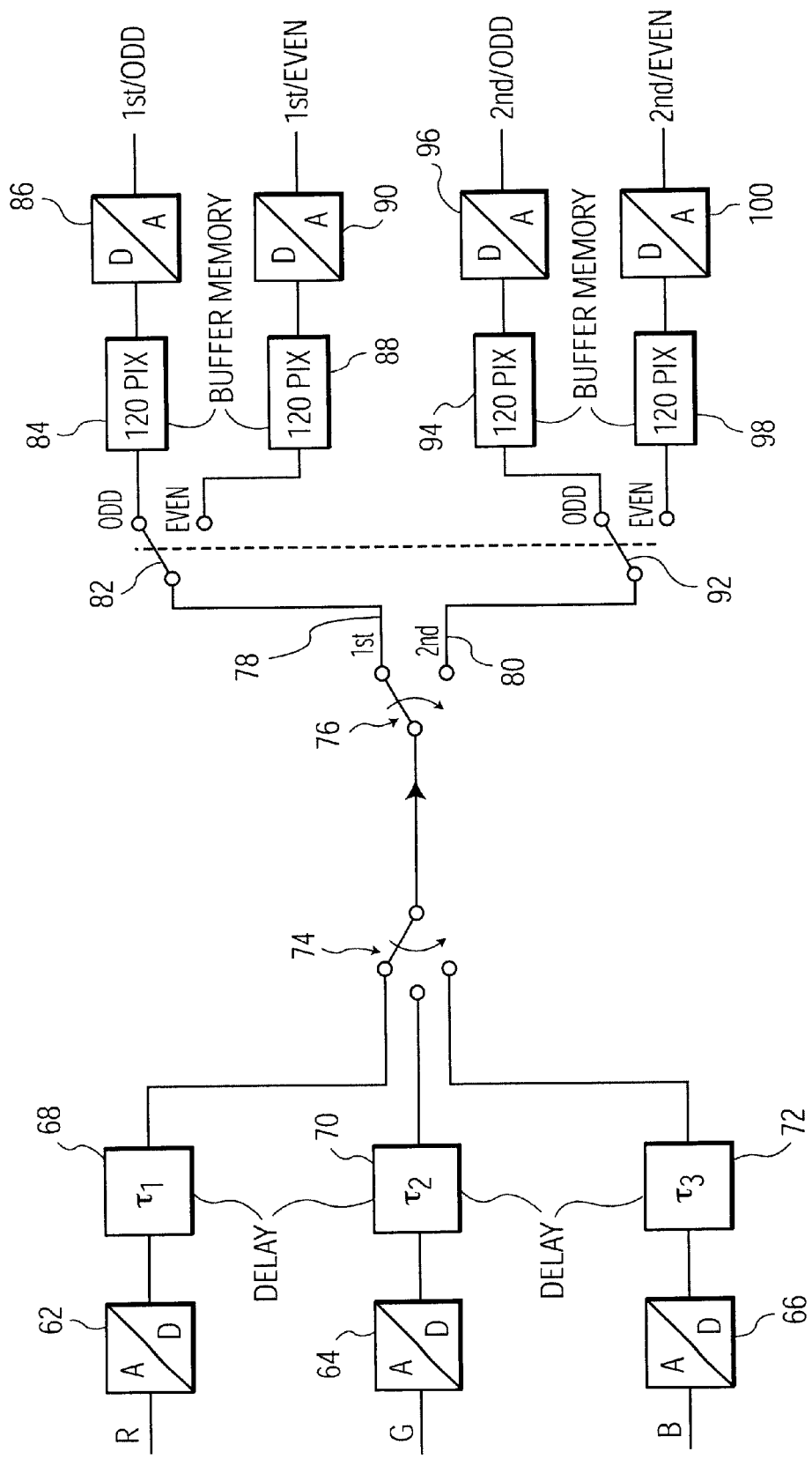
FIG. 4 is a diagramatic representation of the video signal processing for driving the LCD panel.

As is known to those skilled in this art the row and column drivers are addressed sequentially with all of the TFTs in one row being turned on simultaneously through a common gate line by one of the row drivers R1, R2, R3. The individual pixels in a row are driven by a series of column drivers which may be arranged in a known manner as illustrated in FIG. 3. The LCD array is laid out such that driver R1 and R3 are connected to the pixels in odd-numbered columns while drivers R2 and R4 are connected to the pixels in even-numbered columns. The column drivers, which are basically memory devices, sample the incoming video signal and store the sample value in the respective memory cell. The three color bands (RGB) are scanned vertically over the panel and during one video frame each row is illuminated by first passing R then G and finally B light bands. The programming of a particular row is performed in a way that e.g., the green values are loaded before the green light band reaches this row but after the red light band has passed by.

In case of equally spaced color bands which scan in a strictly linear fashion with no overscan present and 450 rows (video lines) per frame, a programming of the LCD panel 52 would be performed in the sequence: R(1), G(151), B(301), R(2), G(152).

To restore a uniform phase relation between the optical and electrical scans, the addressing of the LCD panel 52 is altered to change the rate of any one color relative to the other. For example, if it is desired to double the speed of one color, e.g., red (R), the addressing sequence is changed to address the red channel twice during the three panel addressing sequence (R, R, G), (R, R, B) to double the speed of the red channel while reducing the addressing of each of the green (G) and blue (B) by half. Such altering of the addressing sequence can be achieved by varying the system clock for each color according to the respective position on the panel, and introducing a varying "blanking" time for the video signal or changing the line sequence to account for the non-linear behavior by random access programming of the LCD panel rows.

Each of the (RGB) signals is input to analog to digital (A/D) converters 62, 64 and 66 and the signals processed into digital form. Thereafter, the R signal is input to a first delay line 68 which will delay the red signal for a time $t_1$. The G signal is input to delay line 70 which will delay it for a time $t_2$ and the blue signal B is input to a delay line 72 to delay it a time $t_3$. The times $t_1$, $t_2$, $t_3$ are selected according to the position and scan speed of the respective color band on the LCD panel 52. The signals then pass through a switch 74 which selects each of the outputs of the delay circuit 68, 70, 72 so that the output of switch 74 is a serial stream with, for example, the pixels of the video lines in the desired sequence to the change the rate of any one color relative to the others. Thereafter, the signals are input to a switching mechanism for applying the serialized delay stream to the light valve 20.

FUNCTIONAL DESCRIPTION

In the method of restoring a uniform phase relation between the optical sweep or scan and the electrical addressing of the LCD pixels to eliminate color artifacts or cross talk, the LCD panel 52 is addressed in altered sequence to change the rate of any one color relative to the others. The normal fixed addressing sequence: (R, G, B . . . R, G, B etc) may be altered, for example to (R,R, G) (R,R,B) to momentarily double the speed of one color channel (R) while cutting the speed of the other two color channels (G&B) in half. These phase adjustments need only be made occasionally to effect restoration of the phase relation between the optical sweep 14 and the LCD 52 addressing.

Although the present invention has been described in conjunction with preferred embodiments, it is to be understood that modifications and variations may be resorted to without departing from the spirit and scope of the invention, as those skilled in the art will readily understand. Such modification and variations are considered to be within the purview and scope of the invention and the appended claims.

Other aspects and features of the present invention can be obtained from a study of the drawings, the disclosure, and the appended claims.

What is claimed is:

1. In a scrolling color projection system wherein a periodic sequence of the three primary color light beams is repeatedly swept across an LCD panel at a fixed rate while a periodic sequential electrical addressing is applied to each row of pixels of the LCD panel in accordance with the particular primary color light beam being swept thereover, the improvement comprising:

restoring a uniform phase relation between the sequence of primary color light beams being swept across said LCD panel and said electrical addressing applied to any given row of said pixels of said LCD panel by altering the sequence of the sweep of a selected primary color light beam over said rows of pixels of said LCD panel in response to a desired change in the sweep rate of said one selected primary color relative to the other two primary colors.

2. The improvement of claim 1 wherein said given row of said pixels of said LCD panel is first addressed twice in sequence in response to one of said primary colors and then addressed in response to a second of said primary colors before being again addressed twice in sequence in response to said one of said primary colors and then addressed in response to a third of said primary colors.

3. The improvement of claim 1 wherein said electrical addressing of said given row of said LCD pixels occurs in response to the position of said given row of LCD pixels relative to the sweep of said primary color light beams over said LCD panel.

4. The improvement of claim 2 wherein said electrical addressing of said given row of said LCD pixels occurs in response to the position of said given row of LCD pixels relative to the sweep of said primary color light beams over said LCD panel.

5. The improvement of claim 1 wherein said alteration of the sequence of the sweep of a selected primary color light beam over said rows of pixels of said LCD panel in response to the desired change in the sweep rate of said one selected primary color relative to the other two primary colors occurs intermittently with the periodic sequence of the three primary colors repeatedly being swept across said LCD panel at fixed rate.

* * * * *